(No Model.) 4 Sheets—Sheet 1.

J. D. SCHOFIELD.
COMBINED COTTON AND CORN PLANTER.

No. 497,688. Patented May 16, 1893.

Witnesses
Jas. K. McCathran
J. H. Diggers,

Inventor
James D. Schofield
By his Attorneys,
C. A. Snow & Co.

(No Model.) 4 Sheets—Sheet 2.

J. D. SCHOFIELD.
COMBINED COTTON AND CORN PLANTER.

No. 497,688. Patented May 16, 1893.

Witnesses
Jas. K. McCathran
J. H. Biggers

Inventor
James D. Schofield
By his Attorneys,
C. A. Snow & Co.

THE NORRIS PETERS CO., PHOTO-LITHO., WASHINGTON, D. C.

(No Model.) 4 Sheets—Sheet 3.
J. D. SCHOFIELD.
COMBINED COTTON AND CORN PLANTER.
No. 497,688. Patented May 16, 1893.
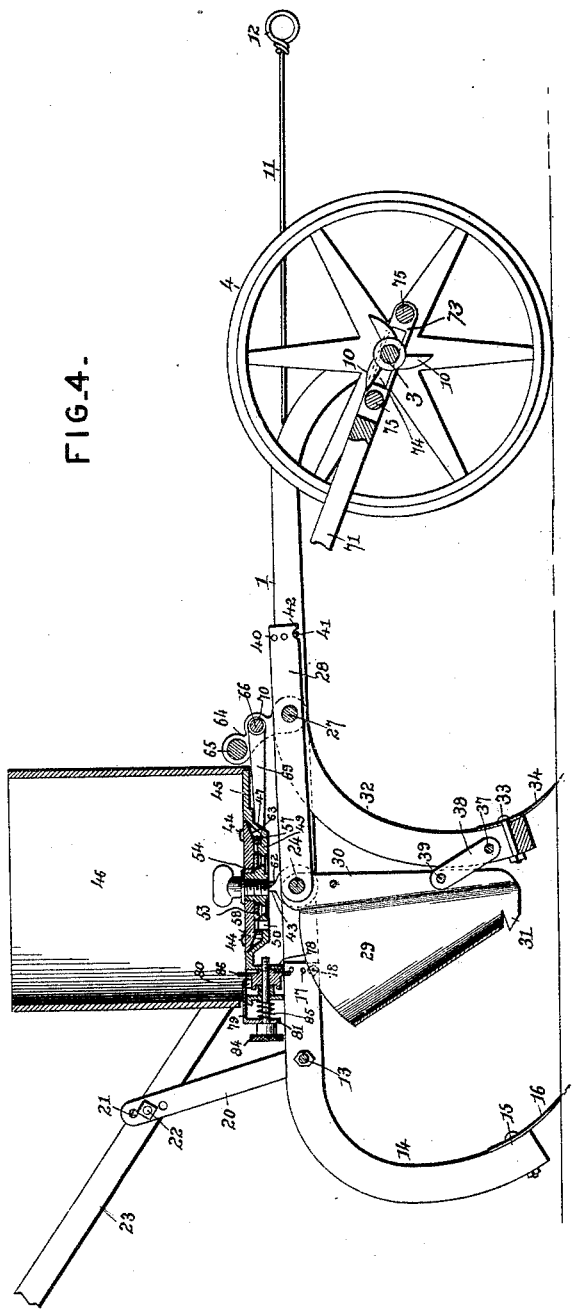
Witnesses
Jas. K. McCuthran
JH Giggers
Inventor
James D. Schofield
By his Attorneys,
C A Snow & Co.

(No Model.) 4 Sheets—Sheet 4.
J. D. SCHOFIELD.
COMBINED COTTON AND CORN PLANTER.
No. 497,688. Patented May 16, 1893.
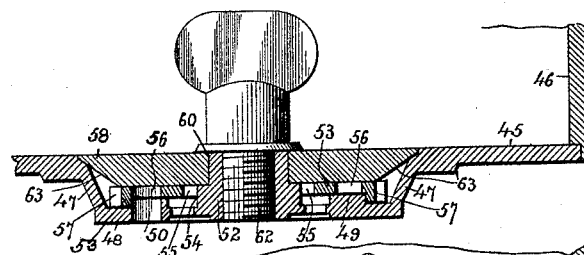
FIG.6.
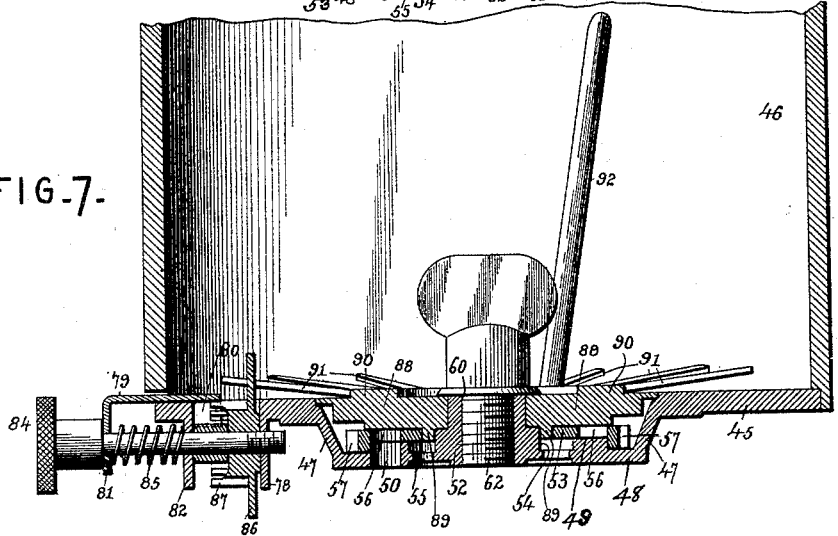
FIG.7.
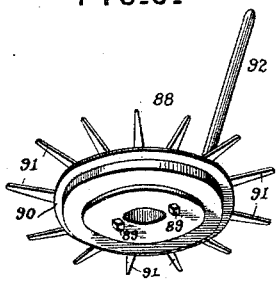
FIG.8.
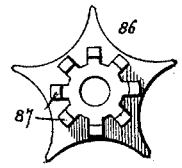
FIG.9.
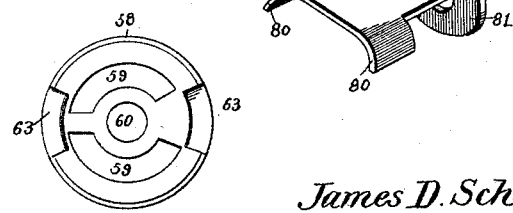
Witnesses
Jas. K. M'Lathran
J. H. Jiggers
Inventor
James D. Schofield
By his Attorneys,
C. A. Snow & Co.

UNITED STATES PATENT OFFICE.

JAMES DROMMOND SCHOFIELD, OF DALLAS, TEXAS.

COMBINED COTTON AND CORN PLANTER.

SPECIFICATION forming part of Letters Patent No. 497,688, dated May 16, 1893.

Application filed October 26, 1892. Serial No. 450,029. (No model.)

*To all whom it may concern:*

Be it known that I, JAMES DROMMOND SCHOFIELD, a citizen of the United States, residing at Dallas, in the county of Dallas and State of Texas, have invented a new and useful Combined Corn and Cotton Planter, of which the following is a specification.

This invention relates to improvements in planters; and the objects in view are to provide a cheap and simple machine adapted to plant either corn or cotton and that at predetermined distances; to so construct the machine as to adapt it readily for change from one form of planter to the other; and to improve the manner of securing the furrow-opening shovel-carrying standard and the seed tube, whereby the former and latter are prevented from breaking or becoming injured should they contact with a stone, stump, or other obstacle of sufficient size and firmness to injure them.

With these and other objects in view, the invention consists in certain features of construction hereinafter specified and particularly pointed out in the appended claims.

Figure 1:
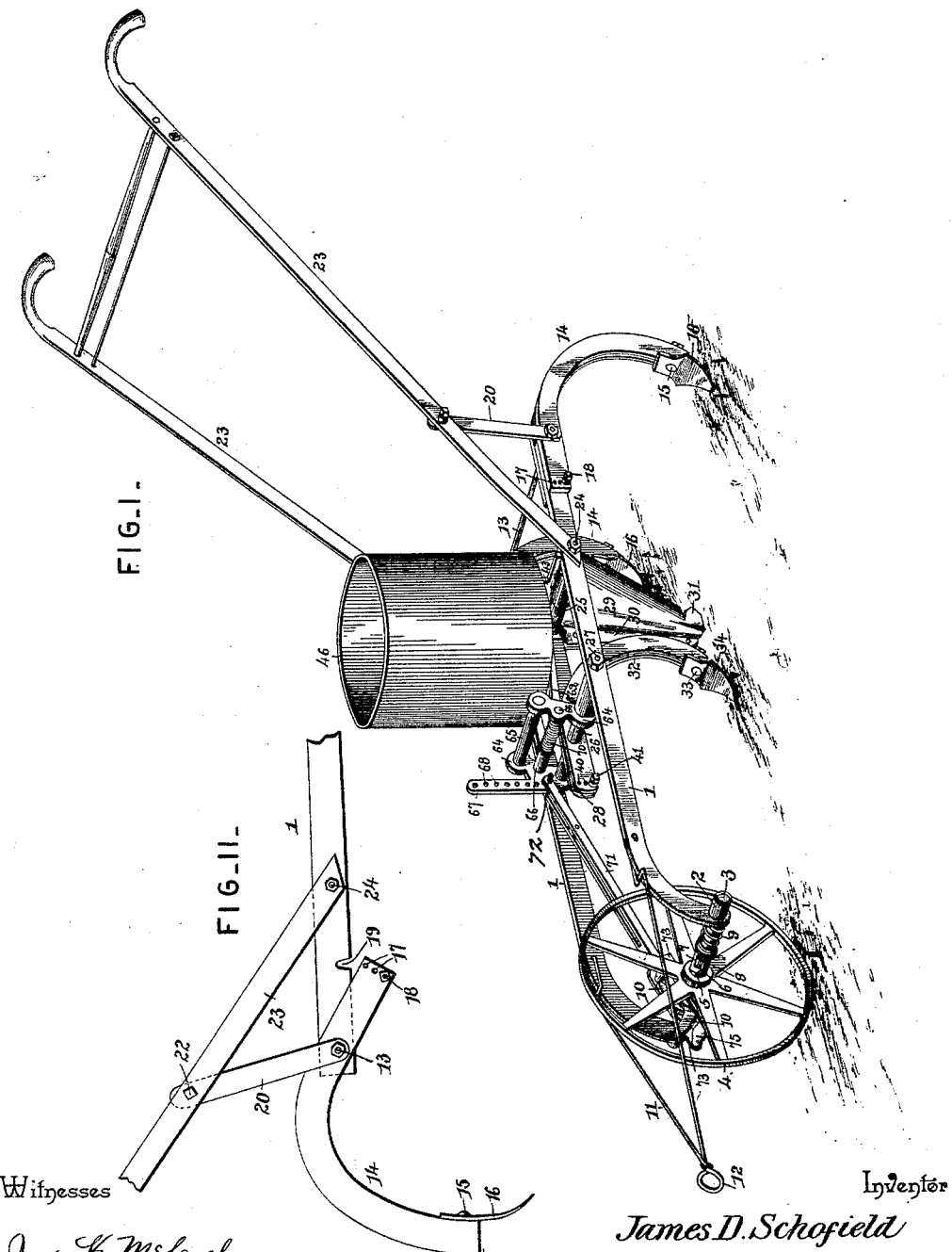
Figure 2:
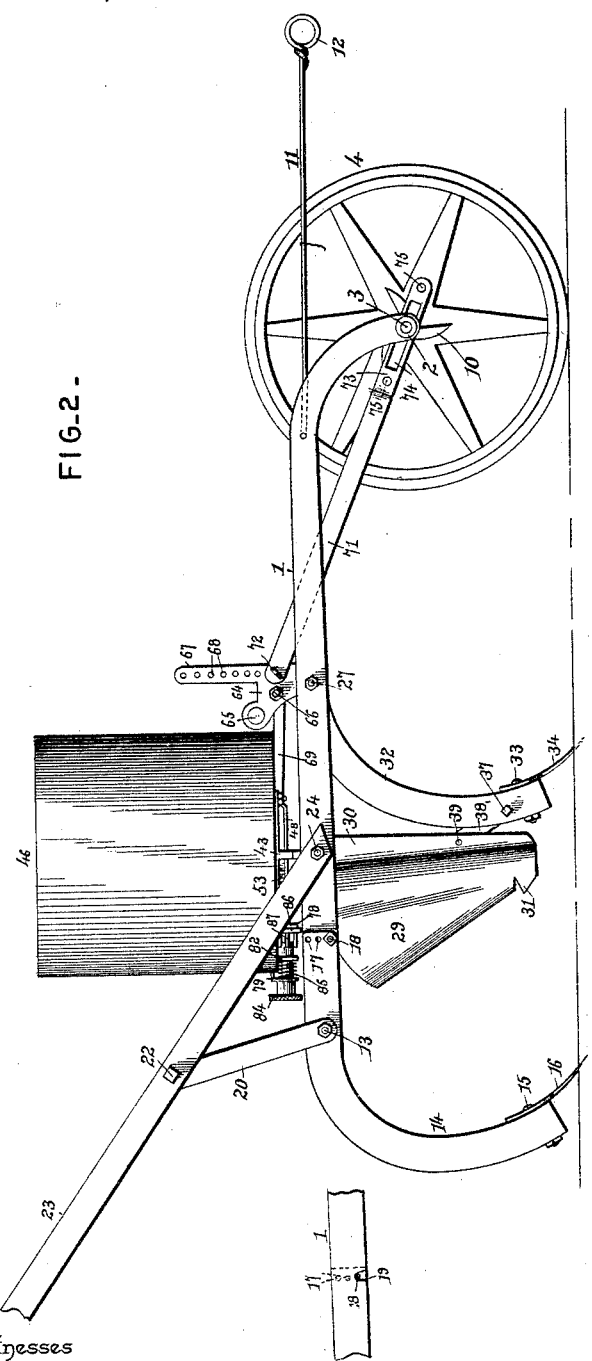
Figure 3:
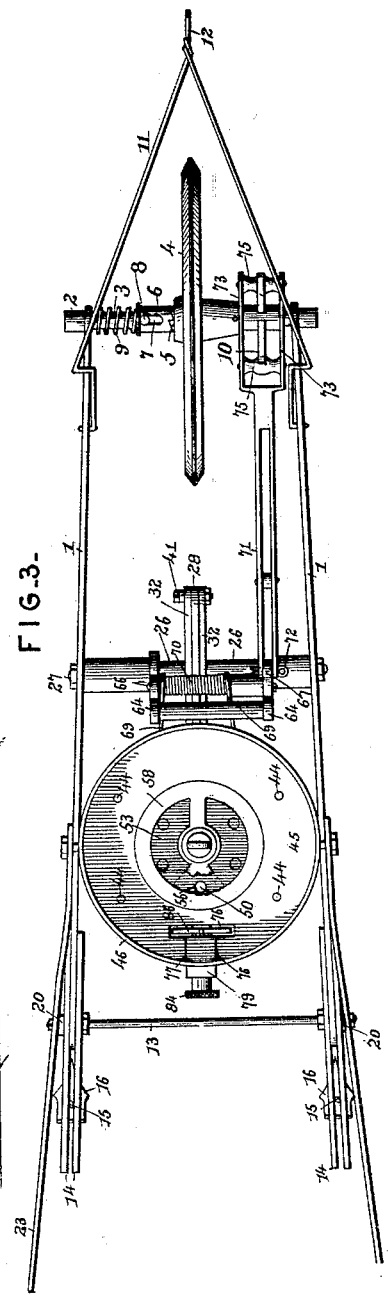

Referring to the drawings:—Figure 1 is a perspective view of a combined corn and cotton planter constructed in accordance with my invention. Fig. 2 is a side elevation, the view being taken from that side opposite to which the perspective view is taken. Fig. 3 is a top plan view. Fig. 4 is a longitudinal section. Fig. 5 is a transverse section. Fig. 6 is an enlarged detail in longitudinal section of the bottom of the seed-hopper, the seed-disk, and cut-off. Fig. 7 is a similar view, the cut-off removed and its place supplied by the cotton-seed disk. Fig. 8 is a perspective view in detail of the cotton-seed disk. Fig. 9 is a detail in rear elevation of the cotton-seed feed wheel; perspective view of the slide; and bottom plan of cut-off. Fig. 10 is a detail of corn disk and operating pawls. Fig. 11 is an elevation of connection between beams and standards.

Like numerals indicate like parts in all the figures of the drawings.

In practicing my invention I employ a framework that consists of the opposite side beams 1, whose forward ends are downwardly curved and provided with transversely opposite bearings 2. In these bearings a transverse rotatable axle 3 is mounted, and the same has fixed thereon to revolve therewith a ground-wheel 4, one side of whose hub is provided with inclined ratchet-teeth 5. Upon the axle at that side of the hub at which the ratchet teeth are formed there is located a toothed clutch-sleeve 6, having a slot 7 formed longitudinally therein. The clutch-sleeve is loose upon the axle, and a pin 8 projects from the axle through the slot in the sleeve. A coiled spring 9 is interposed between a stop on the axle and the outer end of the clutch-sleeve, whereby the latter is pressed into engagement with the teeth on the hub, so that as said wheel revolves forward the same carries with it the axle. The axle at the opposite side of the wheel is provided with a three-pronged cam 10, or other forms of cams may be employed, the function of said cam being hereinafter particularly described. A draft-bail 11, has its terminals secured to the curved end of the beams 1, and converging in front of the wheel terminates in a draft-eye 12.

Pivoted to the rear extremities of the beams 1 by means of a transverse tie-bolt 13, is a pair of bifurcated shovel standards 14, to the lower ends of which by means of adjustable heel-bolts 15 covering-shovels 16 are secured. The upper ends or bifurcations of these standards embrace the beams at their opposite sides. These bifurcations are provided each with a series of three perforations or more 17, and in any pair of the same a transverse bolt 18 is removably mounted. These bolts enter recesses 19 formed in the lower edges of the beams 1 and act as stops to prevent an upward and rearward movement of the upper ends of the beams and also to bind upon the beams and secure the standards thereto by frictional contact. I thus do away with break-pins at these points, and by tightening the bolts can secure any desired amount of binding action or frictional contact between the clamping bifurcations of the standards and the beams and should the shovels come in contact with such objects as are liable to impair them if forced therethrough, the said standards will immediately swing upon their pivots, their frictional contact with the beams being overcome by the pressure brought to bear against their lower ends. From the tie-bolt that secures the standards pivotally to the beams there rise short vertical standards 20 and the same are provided near their upper ends with adjacent holes 21, into any one of which may be passed bolts 22, which serve to secure in position and at a proper height a pair of handles 23, the lower ends of said handles being secured by means of a tie-bolt 24 to the opposite beams 1. Washers 25 are mounted upon this tie-bolt and are spaced apart slightly at their inner or adjacent ends. Similar washers 26 are mounted upon a transverse tie-bolt 27 located in advance of the tie-bolt 24, and the washers of the two bolts at their inner ends embrace a short central longitudinal beam 28, whose forward end projects beyond the front tie-bolt.

29 designates the seed-spout, and the same is formed preferably of sheet-steel, or other metal in sheet-form, and is of inverted cone shape. The edges of the material of which the seed-spout is formed, are bent forward forming a pair of flanges 30, and at their upper ends are perforated and pivotally mounted upon the tie-bolt 24, being embraced by the inner ends of the washers, and in turn embracing the opposite sides of the central short beam 28. The lower rear side of the seed-spout is transversely cut and the stock or material removed by the cut is bent rearward forming flanges or ears 31.

A bifurcated standard 32 embraces the short longitudinal beam 28, and between its ends is pivoted upon the front tie-rod 27. This standard is curved similar to those previously described, and a heel-bolt 33 extends through the same, is adjustable in the lower end thereof, and serves to secure in position a furrow-opening or forming shovel 34. Pivotally connected between the bifurcations of this standard above the heel-bolt by means of a transverse pivot bolt 37 is the front end of a link 38, the rear end thereof being pivotally connected by a bolt 39 between the flanges formed by the forward bending of the stock of the seed-spout. The front or upper end of the furrow-opening standard is provided with a series of pairs of openings or perforations 40, and through any one of these pairs there is passed a removable bolt 41, which rests within a notch or seat 42 formed in the front extended end of the central longitudinal beam before described. By tightening this bolt the requisite binding action between the bifurcations of the standards and the central beam is secured so that the standard is prevented from swinging to the rear by reason of the frictional contact or binding that takes place between the standard and beam. It will be seen that should the furrow-opening shovel come in contact with a stone, stump, or other obstacle liable to injure it, it will yield from the pressure exerted thereagainst, swing to the rear, and through the medium of the link connection between said standard and seed-spout will force the latter to swing to the rear upon its pivot so that all of the standards and the seed-spout may readily ride over obstacles without injury, and such advantages are secured without the use of brackets, bolts, or springs usually employed for this purpose.

Rising from the washers 25, are short standards 43 and upon the same is secured by bolts 44 a ring 45 that serves as the bottom of the cylindrical hopper 46 that is seated thereon. A pair of longitudinally-opposite brackets 47 depend from the inner edge of the ring and support a stationary disk 48. This disk is provided upon its upper side with an annular track 49, and within the same with seed-discharging perforations 50. Within the track there is also provided an upwardly-extending interiorly-threaded hollow stud 52.

A seed-disk 53 has its under side concaved or contersunk and is seated upon the track of the disk. This seed disk is provided with a central circular opening 54 that receives the stud and is designed to revolve thereupon. At diametrically opposite sides of the disk square recesses or openings 55 are provided, while beyond them the disk is at intervals further provided with circular seed-discharge openings 56, that are designed to register with the seed openings in the stationary disk. The seed-disk has its outer edge toothed, as indicated at 57.

Surmounting the two disks is a circular cut-off 58 that is provided with curved seed-slots 59. The cut-off 58 has a central perforation 60, which receives the upper end of the stud and the external shape of the cut-off is such that it closes or fits within the opening of the ring or bottom of the hopper. Threaded removably in the stud is a screw 62 whose upper end or head clamps upon the cut-off retaining the cut-off, seed-disk, and stationary-disk in position. The under side of the cut-off at its diametrically-opposite outer edges has recesses 63 formed therein and these receive the brackets that depend from the bottom of the hopper and which aid in preventing a rotation of the cut-off.

A pair of rock-arms 64 have their lower ends pivoted upon the front tie-rod 27 and their upper ends connected by a bolt 65. Between their ends the rock-arms are connected by a transverse-bolt 66, and one of them has projecting at an angle and forwardly therefrom an arm 67 which is provided with a series of adjusting holes 68. A drawing and pushing pawl 69 is mounted on this bolt just mentioned and a light coiled spring 70 is likewise mounted on the bolt and interposed between the front ends of said pawls. These pawls pass rearward and rest upon the fixed or stationary disk 48 and are designed to engage the inclined teeth of the disk 53, the pushing pawl operating said seed-disk when the rock-arms swing to the rear and the drawing-pawl operating said disk when said rock-arms swing to the front as will be readily apparent.

71 designates a pitman and the same is bifurcated at its rear end in order to embrace the arm that projects from the rock-arm.

The bifurcations are perforated at their rear ends and by means of a split spring-pin 72 said pitman may be connected pivotally with any one of the peforations in said arm, so that as will hereinafter appear, the pitman being connected with and actuated by the axle will give a longer or shorter throw to the rock-arms, and consequently will discharge the corn at longer or shorter intervals. At its front end the pitman is divided so as to form a frame 73 somewhat rectangular, and the sides of the frame are longitudinally slotted as at 74, the slots receiving the axle of the machine at opposite sides of the cam. The front and rear ends of the frame have journaled therein loose friction-rollers 75, and these are operated upon successively by the curved surfaces of the prongs of the cam so that as the axle revolves the pitman is reciprocated, motion is conveyed by it to the rock-arms which are swung to a predetermined distance, and from the rock-arms by means of the pawls to the seed-disk, all as will be apparent.

So far as I have described my invention, the same is adapted for drilling corn, and I will now proceed to describe the attachment which I employ in connection therewith for the purpose of planting cotton, having it understood, however, that if desired I may omit these attachments from the machine, or construct the machine with these attachments and omit certain other unnecessary adjuncts that have been described, by which I mean the corn-planting disk, hereinbefore termed, the seed-disk.

A T-shaped slot 76 is formed in the rear edge of the ring or bottom 45 of the hopper, and said slot has its longitudinal portion provided with off-sets 77 adjacent to its transverse portion, and at the rear edge of the ring there is located a depending bearing-portion 78. A slide 79 is provided at its front end with depending lugs 80, which engage with the off-sets, and at its rear end beyond the ring has a depending bearing-portion 81. A bearing-bracket 82 is located upon the under side of the ring and through the three bearing-brackets or lugs passes a set-screw 84, which is threaded in the inner bracket of the series. A coiled spring 85 is interposed between the two outer brackets, and the tendency of the spring is to force the screw and the slide toward the rear. By rotating the screw, however, the spring is compressed and the set-screw fed inward. The screw also carries a star-wheel 86, and in rear of the same a toothed-hub 87.

In converting the machine from a corn to a cotton planter, the set-screw for retaining the disk and cut-off in position, is first removed, after which the cut-off is removed leaving the seed-disk in position.

In constructing the machine simply for the purpose of planting cotton the seed-disk may be formed without seed openings, but simply with the toothed edge.

88 designates the cotton-disk, and the same has formed upon its under side, at diametrically opposite sides of a central opening depending lugs 89, which take into the diametrically-opposite recesses 55 of the seed disk 53, whereby the seed-disk and the cotton-disk become locked and a movement of the seed-disk is transmitted to the cotton-disk. A ring 90 is mounted upon the cotton-disk and from the same radiates a series of stirring-prongs or spurs 91, and from the ring rises a stirring-arm 92. These prongs or spurs engage with the star-wheel 86 before described, and as the cotton-disk is revolved, so also is the star-wheel, which latter serves to feed the cotton seed through the slot in the bottom of the hopper. The remainder of the planting operation being precisely like that heretofore described as relates to the planting of corn, a detailed description of such operation is not deemed necessary. It will be seen, however, that the seed-disk being operated in the manner heretofore described, the cotton-disk will be carried thereby, the same set-screw that maintains the cut-off upon the seed-disk serving its function with relation to the cotton and the seed disk also. The cotton being constantly agitated by the vertical agitating-arm is fed by the cotton-disk to the star feed wheel, and the latter being operated serves to feed continuously the cotton-seed through the T-shaped slot. By regulating the set-screw that carries the feed-wheel the slide may be made to increase or decrease the size of the slot through which the cotton seed is fed and hence increase or decrease the output of cotton-seed.

From the foregoing description in connection with the accompanying drawings, it will be seen that I have provided a machine embodying simplicity of construction and cheapness, that I avoid in the make-up of the machine any gearing or other expensive forms of mechanisms making all of the parts move positively with litte friction or wear and adapt the same for ready conversion from one form of machine to the other, whereby corn or cotton may be planted, the former being drilled at predetermined distances apart and the latter discharging in quantities desired; and finally that I avoid the employment of break-pins and their attendant cost and trouble in replacing the same, and yet at the same time, secure all the advantages arising from such a construction, in that by the frictional contact or binding action of the bifurcated standards against the beams, I am enabled to overcome any liability of breaking the standards or shovel points by contacting with stones, stumps, or other obstacles.

It is to be understood that changes in the form, proportion, and the minor details of construction may be resorted to without departing from the principle or sacrificing any of the advantages of this invention.

Having described my invention, what I claim is—

1. In a planter, the combination with the frame-work and a hopper supported by the same, of a seed-spout pivotally connected below the hopper, a beam located in front of the spout, a bifurcated standard embracing the beam, a shovel carried by the standard, pivotal connections between the beam and seedspout, and a binding-bolt passed through the bifurcations of the standard and serving to bind the same against the opposite sides of the beam, substantially as specified.

2. In a planter, the combination with the frame-work and the superimposed hopper, of the pivoted seedspout located below the hopper, a beam located in advance of the seedspout, a standard pivotally connected to the beam, means for binding the standard frictionally against the beam, and a pivoted link connecting the standard with the seed-spout, substantially as specified.

3. In a planter, the combination with the frame-work, the rotatable axle and the wheel mounted thereon, of a hopper supported by the framework, a rotatable toothed seed-disk mounted in the hopper, a transverse shaft located in the framework, rock-arms pivoted on the shaft, a transverse shaft connecting the rock-arms, a pushing and a drawing pawl mounted loosely on the shaft, a coiled spring interposed between the two and also mounted on the shaft, and a pitman actuated by the axle and connected with the rock-arms, substantially as specified.

4. In a planter, the combination with the frame-work, the axle, the ground-wheel, and the hopper, of a toothed feed-disk rotatably mounted in the bottom of the hopper, a transverse shaft located in the framework, a pair of rock-arms rising from the shaft, a transverse shaft connecting the rock-arms, a pushing and a drawing pawl loosely mounted on the transverse shaft that connects the rock-arms, a spring interposed between the ends of the pawls and mounted on said shaft, a cam extending from the axle, a pitman pivotally connected to the rock-arms and having its forward end spread to form a frame embracing the cam and its opposite sides slotted to receive the axle and provided at its front and rear ends with friction rollers adapted to be struck successively by the cam of the axle, substantially as specified.

5. In a planter, the combination with the frame-work, the axle, the ground-wheel, the superimposed hopper and the rotatable toothed seed-disk, of a transverse rock shaft, a rock-arm rising therefrom, a pawl carried by the shaft, a pitman operated by the axle and adjusting devices for pivotally connecting the rear end of the pitman with the rock-arm, substantially as specified.

6. In a planter, the combination with the frame-work, the axle, the ground-wheel, the superimposed hopper and the toothed seed-disk supported by the hopper, of a transverse shaft, a pair of rock-arms loosely mounted thereon, a shaft connecting the rock-arms, and a pushing and drawing pawl carried by the shaft, a spring interposed between the ends of the pawl and mounted on the shaft, an arm having a series of openings rising from one of the rock-arms, a pitman rising from the axle and a pin passed removably through the rear end of the pitman and one of the perforations of the arm, substantially as specified.

7. In a planter the combination, with a frame-work, a ring supported thereby, a hopper encircling the ring, a stationary disk located below the opening in the ring and having an upwardly-disposed threaded hub or stud a seed-disk having perforations aligning with those of the stationary disk, and a central opening to receive the stud, a cut-off surmounting the seed-disk, means for operating the seed-disk, said cut-off and seed-disk having central openings for the reception of the threaded stud, and a set-screw passing through the openings in the seed-disk and cut-off and into the stud, substantially as specified.

8. In a planter, the combination with the frame-work, a ring supported thereby, a hopper supported by the ring, brackets depending from the inner edge of the ring, a stationary disk carried by the bracket and having a central internally threaded upwardly-disposed stud, a seed-disk having a central opening for the reception of the stud mounted on the stationary disk, a superimposed perforated and slotted cut-off having diametrically-opposite notches receiving the brackets, a screw passed through the perforations of the seed-disk and cut-off and into the stud of the stationary disk, and means for operating said seed-disk, substantially as specified.

9. In a planter, the combination, with the frame-work, the ring supported thereby, the brackets depending from the ring, the stationary disk supported by the brackets, said disk having a central internally-threaded upwardly-disposed stud and an encircling annular track, and a hopper carried by the ring, of a seed disk having a recessed under side, and a central perforation mounted upon the aforesaid stationary-disk, a perforated and slotted cut-off surmounting the seed-disk and receiving the stud, means for operating the disk, and a screw thread in the stud and securing the parts in position, substantially as specified.

10. In a planter, the combination with the frame-work, the superimposed ring having the slot, the feed-wheel mounted in the slot for rotation, a stationary-disk arranged below the ring and provided with an upwardly-disposed interiorly threaded stud, a disk having a toothed periphery mounted on the stationary-disk having a central opening for the reception of the stud, and at each side of the same recesses, a cotton-seed disk having rotating arms engaging the feed-wheel surmounting the said rotatable disk, the said cotton-disk having a central opening for the reception of the stud, and depending lugs for engaging the recesses of the rotatable disk, means for operating said rotatable stud, and an agitating arm carried by the cotton-seed disk, substantially as specified.

11. In a planter, the combination with the frame-work, the ring supported thereby, the hopper carried by the ring, a seed-slot formed in the ring, a feed-wheel mounted in the slot of a stationary disk below the ring, said disk being provided with a central internally threaded stud, a disk rotatably mounted on the stud, arms radiating from the disk and engaging the feed-wheel, and means for rotating the disk, substantially as specified.

12. In a planter, the combination with the frame-work, the superimposed ring having a seed-slot, a wheel rotatably mounted in the slot, and a hopper supported by the ring, of a stationary disk below the ring having a centrally-threaded hub, a disk having a toothed edge mounted for rotation on the hub, means for operating said disk, a cotton-seed disk mounted on the toothed disk and provided with radiating arms engaging the wheel, and an upwardly-disposed stirring-arm, and a screw passed through the cotton-seed disk, toothed disk and into the stud, substantially as specified.

In testimony that I claim the foregoing as my own I have hereto affixed my signature in the presence of two witnesses.

JAMES DROMMOND SCHOFIELD.

Witnesses:
A. V. LANE,
W. G. RODGERS.